June 10, 1930.  F. H. AVERS  1,762,378

MOTION PICTURE MACHINE

Filed Feb. 26, 1923  3 Sheets-Sheet 2

Inventor.
Franklin H. Avers
Daniel Brennan
Attorney.

June 10, 1930.  F. H. AVERS  1,762,378
MOTION PICTURE MACHINE
Filed Feb. 26, 1923  3 Sheets-Sheet 3

Inventor.
Franklin H Avers
by Daniel Brennan,
Attorney.

Patented June 10, 1930

1,762,378

UNITED STATES PATENT OFFICE

FRANKLIN H. AVERS, OF PORTAGE, WISCONSIN

MOTION-PICTURE MACHINE

Application filed February 26, 1923. Serial No. 621,339.

This invention relates to improvements in motion picture machines.

It is an object of the invention to provide a machine of this kind which is equally adapted for taking and for projecting pictures and which is particularly suitable for amateur purposes.

It is also an object of the invention to provide a machine of this character in which a plurality of images may be produced in transverse alinement on a film without necessitating a transverse shifting movement of the film or a movement of the objective transversely of the film, thereby rendering possible the construction of an apparatus of greatly reduced dimensions as compared with other apparatus in which transverse rows of images are produced on a film.

The invention, furthermore, has the object of providing a machine of this kind in which films of standard width can be used with means for alternately changing the sequence of the images in the transverse rows, one row beginning at the left hand end of the film and proceeding towards the right, the next one beginning at the right hand end and proceeding towards the left, etc.

It is also an object of the invention to provide a machine of this character in which the various rows produced on the film have their pictures in transverse alinement as contrasted with apparatus in which pictures on a relatively wide film are arranged in spiral form and in which the images following each other longitudinally of the film also are offset transversely from each other.

It is also an object of the invention to produce a machine of this character in which a rotary shutter causes the production of transversely alined pictures in a row, said shutter being of extremely simple construction and being well adapted to obstruct all of those portions of the film which are not to be exposed temporarily to the action of light, either for projecting purposes or for the taking of pictures.

The invention also has the object of providing a rotary shutter by means of which in a single rotary movement several individual exposure openings for more than a single row of pictures are presented.

It is furthermore an object of the invention to combine in an apparatus of this character, with the taking mechanism for pictures, means for producing indicating marks at intervals on the film to facilitate the separation or splicing of film portions where required.

It is another object of the invention to provide a motion picture mechanism in which the optical equipment including the objectives may readily be reversed for the operations of taking pictures and projecting them respectively, so as to bring the lenses during the taking operation as close to the film as possible, while in the projecting operation the lenses may be at a greater distance from the film to facilitate the centering of the projected picture on the screen.

The invention has also the object of providing a motion picture machine for projecting purposes in which the images are alined in transverse rows on the film with means for imparting a movement to the source of light during projection so as to effectively concentrate the illumination upon that picture which is to be projected at a given instant.

The invention also has the object of providing a machine of this character wherein the operator may effectively mark the film at any desired marginal point longitudinally of the film for the purpose of indicating prior to development of the film the terminals of groups of pictures.

The invention also contemplates combining with an apparatus of this character a counter in cooperative connection with the actuating mechanism for the film feeding device so as to indicate to the user of the apparatus the number of series of pictures taken or projected without necessitating an opening of the apparatus.

It is also an object of the invention to provide an apparatus of this kind with improved casings for film spools of standard width permitting the removal or insertion of loaded containers for the film without requiring a dark room for this purpose.

With these and numerous other objects in view which will become apparent from the following specification, an embodiment of the invention is illustrated by way of example in the accompanying drawing and is described in the following specification.

In the drawings:

Fig. 3 is a vertical sectional view on line 3—3 of Fig. 1;

Fig. 4 is a detail sectional view of the film guide and mounting of the lenses;

Figure 8:
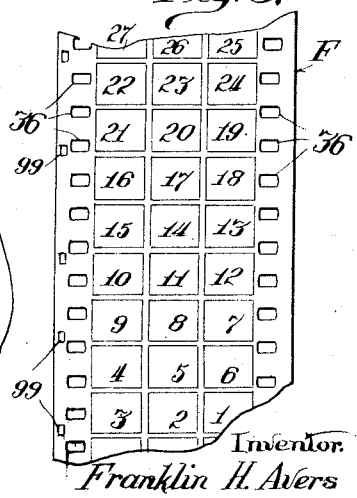

Fig. 8 indicates a portion of the film on which the pictures are numbered in the sequence in which they are taken in the normal operation of the apparatus.

Figure 9 is a lens plate and the lenses secured thereto.

The camera comprises a casing of approximately rectangular cross-section having a front wall 1, a rear wall 2, a top 3, bottom 4 and side walls 5 and 6. The two side walls are advisably removable to grant access to the film and are in the preferred form of the apparatus in hinged connection with other parts of the casing, which connections, however, are not shown in the drawing. The casing contains compartments adjacent the front wall 1 of the camera, Fig. 3, the upper compartment being partly confined by the front wall, vertical walls 7 and 7ᵃ, a bottom 8, the top 3 and the removable side wall 5, while the lower compartment has the side wall 9, a top 10, the removable side wall 5 and the bottom 4 respectively. These compartments 11 and 12 serve for receiving film storage devices in the form of containers, as shown in Fig. 3. The spool 13 of the unexposed film (or of the film to be projected) is enclosed within a container 14 of substantially cylindrical form having a cap which is secured to the container by frictional contact and which can readily be removed or applied. The container 16 in the lower compartment is of similar construction and also provided with a closing cap 15 and is adapted to receive the film unwound from the interior of the upper container 14. The container 16, however, in order to be securely held against rotation, is provided with a substantially rectangular extension 17, Fig. 3, which rests on the bottom wall 4 of the camera. In order to support the container 14 which holds the unused film 13, a pin 18 projects inwardly from the vertical side wall 7 of the upper compartment 11, on which the container 14 is placed, the container being prevented from rotation about the pin 18 partly by the frictional contact of a portion of the container with the top wall 3 of the camera.

While it has been stated above that the film to be projected may be inclosed within the container 14, it should be noted here that for the projection of films it is not essential that they should be unwound from or wound onto spools which are inclosed in the containers. For projecting purposes the containers may be removed and ordinary film spools, as indicated at 23, may be placed on corresponding pins in the upper and lower compartments.

An extension 19 forming a part of the upper container 14 communicates with the interior of the same; said extension serving for guiding the film from the interior of the container to the space in front of the fixed film opening 102 through which the film may successively be exposed. The film F leaves the extension 19 through a relatively narrow slot so as to be held against lateral displacement and the extension is provided, as shown in Fig. 3, with a lip which overlies that portion of the film presented between the upper edge of the film guide and the lower edge of the extension 19.

In a similar way the lower container 16 also is provided with a guiding extension 21 into the slot of which the film is introduced to be fastened at one end in a well known way to a wooden cylindrical spool 22 rotatably secured therein. In the rear of this lower container a rewind spool 23 may be rotatably held, or a reserve container for an unused film may be carried.

The unwinding of the film from the spool loosely secured to the pin 18 in the upper compartment is effected in the embodiment illustrated by positively driving the spool 22 on which the film is to be wound up in the lower container 16. For this purpose a shaft indicated at 25 projects through the side wall 6 of the camera, and is supported therein in bearings 26, Fig. 7. The projecting end of this shaft has a socket in which the journal pin of a crank 27 may be removably inserted, the journal having a transverse pin 24 which enters a slot 28 in shaft 25. This crank is provided with a counter-weight 29 so as to render the operation of the drive more uniform.

That portion of shaft 25 which extends into the interior of the camera carries a sprocket wheel 30 over which a chain 31 is trained. This chain serves for driving a sprocket wheel 32 on a shaft 33, Fig. 1, which finds its support at one end in a bracket 34, Fig. 3, secured to the bottom 4 of the camera and which is supported intermediate its ends, furthermore, by a bearing 35 mounted on the lateral wall 9 of the lower compartment 12. That portion of the shaft 33 which projects into the interior of the compartment 12 is shaped so as to receive frictionally the spool 22 for winding up the film.

Figure 5:
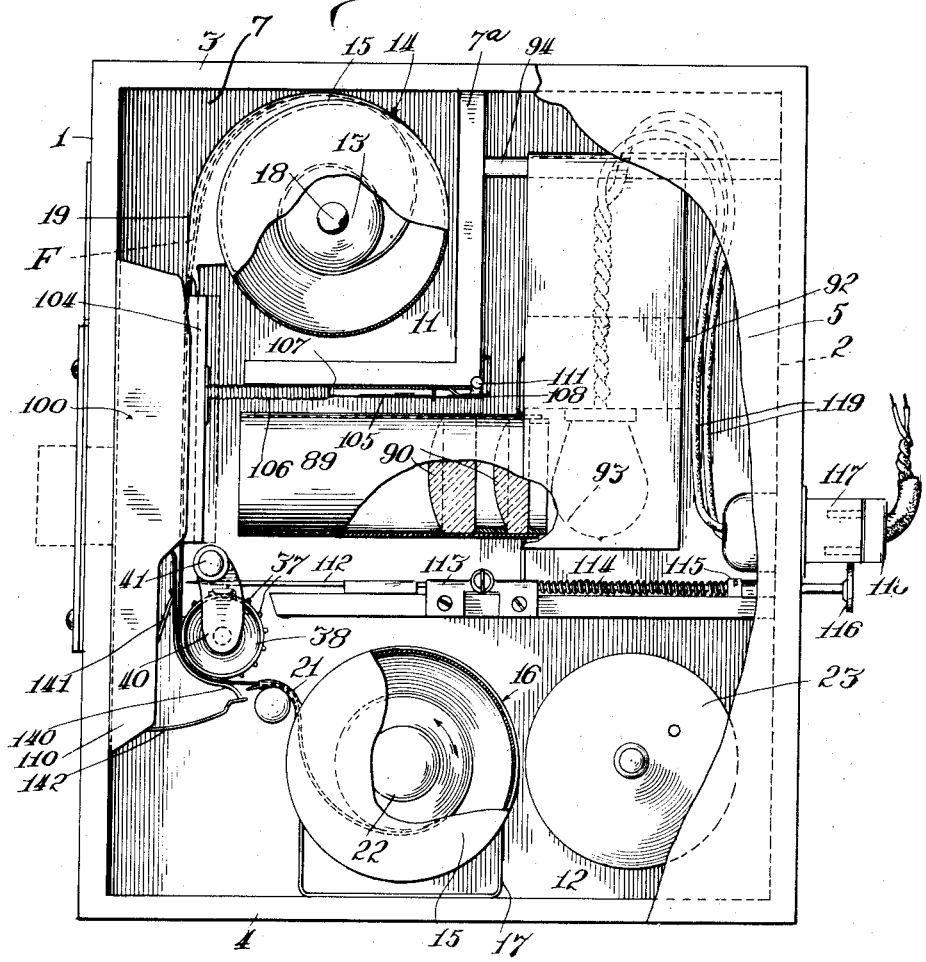
Fig. 5 is a front elevation of the shutter in association with a portion of the film.
Figure 6:
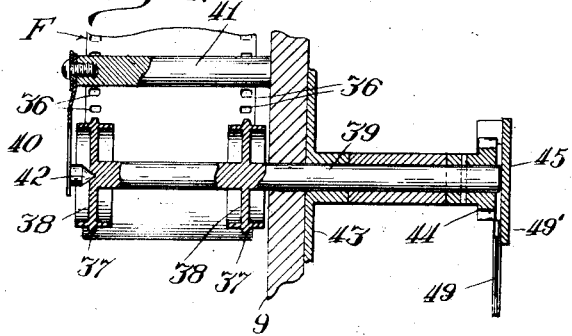
Fig. 6 is a sectional view through the film feeding sprockets and their shaft.

The chain 31 through which the lower winding element 22 is driven may be sufficiently loose to permit of inequalities during the winding operation. A positive step by step movement, is imparted to the film by a feeding device. The film F, as shown in Figs. 5 and 8, is provided near its marginal portion with parallel series of openings 36 of standard arrangement. These openings are adapted to be gripped by the spikes or teeth 37 of a pair of film feeding sprocket wheels 38 which are mounted on a shaft 39 near the front end of the camera. The shaft 39 is supported at one end by a bracket 40 of resilient sheet metal, pivotally secured at its upper end to a pin 41 which is fastened to the lateral wall 9 of the compartment 12. This shaft 39 has a centering socket at one end to receive the bearing pin 42 on the holding bracket 40, and is also supported in a bearing 43 secured to the wall 9. It projects through this bearing 43 and carries at the other end a ratchet 44 which is rigidly secured to the shaft.

Figure 2:
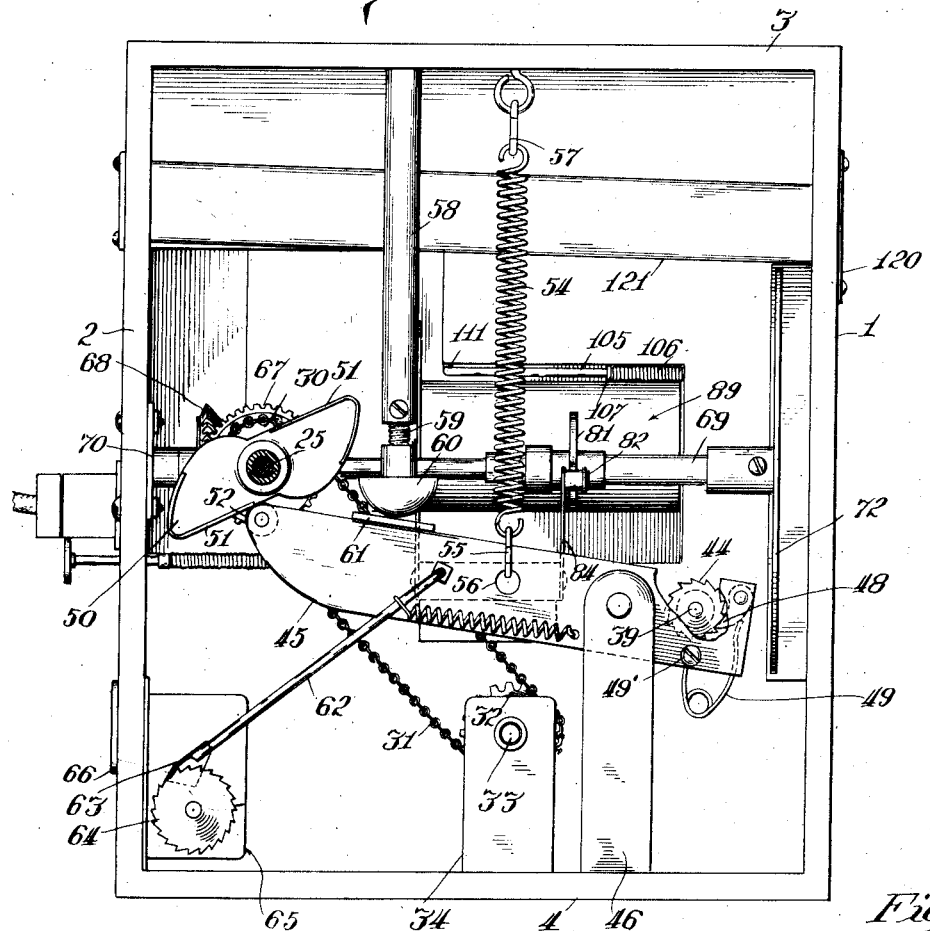
Fig. 2 is a vertical sectional view on line 2—2 of Fig. 1.

In order to impart a step by step movement in a predetermined direction to the ratchet 44, a lever 45, Fig. 2, is pivotally mounted on a bracket 46 secured to the bottom of the camera. The lever fulcrumed in said bracket 46 pivotally carries at its rear end a pawl 48 which is permanently forced into engagement with the ratchet 44 by means of a spring 49 fixed to the lever at 49' and pressing against the back of the pawl 48. Upon oscillation of the lever 45 the pawl 48 sliding on the teeth of the ratchet 44 will alternately effect a movement of said ratchet and thereby also of sprocket wheels 38. An intermediate step by step feeding movement is therefore obtained for the film through which the film is positively longitudinally advanced. The film F leaving the sprocket wheels 38 may be arranged in a loop (not shown) or other devices may be provided to counteract any discrepancies between the movement of the spool body 22 in the lower container 16 and the positive feed mechanism 38 of the film.

A guard 140 is pivotally supported in front of the sprocket wheels, and is normally forced into operative position by a spring 141, against a catch 142, which limits the movement of said guard.

Figure 7:
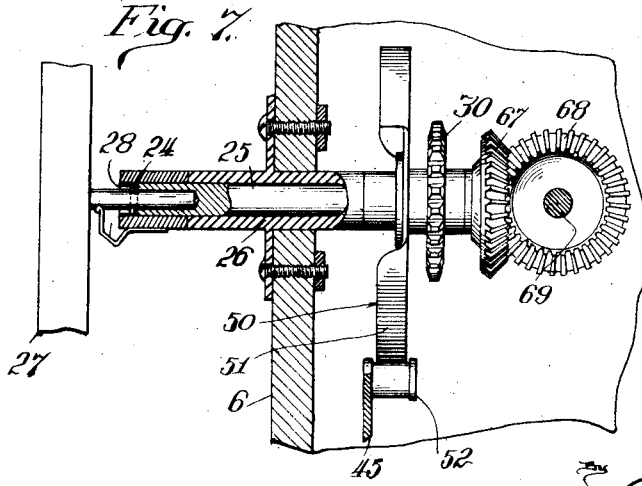
Fig. 7 is a sectional view of the drive shaft with a portion of the handle.

The oscillatory movement for the lever 45 is derived from a cam 50, as shown in Figs. 2 and 7, this cam being mounted on the main shaft 25. The cam 50 is a double cam having two wings which are located in the same plane and which are provided on a portion of their circumference with flanged extensions 51. By means of these flanged extensions the wings alternately act upon a roller 52, which projects laterally from the lever 45. It will also be seen from Fig. 2, in which one of the flange extensions 51 is shown to get out of contact with the roller 52, that an interval occurs between the instant at which this flange 51 becomes disengaged and that instant at which the other flange enters into engagement. Each of the wings of the cam has a straight edge, while the other edge is curved. If according to Fig. 2 rotation is imparted to the shaft 25 in clockwise direction, the curved portion of the flange 51 will cause a slow depression of lever 45 and hence a slow positive movement of pawl 48. After the curved portion of the flange 51 has passed the roller, 52, the straight portion of the flange will permit the lever 45 to be returned suddenly to its original position, Fig. 2. In order to effect this sudden return of the lever 45 to normal position a relatively strong spring 54 is connected with the lever 45 by means of a link 55 hooked into an opening 56 of the lever, the other end of the spring being secured to the top wall 3 of the camera by means of another link 57. By deforming the link 57 the operative tension of the spring may be adjusted as desired. During this return the pawl 48 is quickly lowered, effecting thereby by means of the ratchet 44 a very sudden rotary step movement of the shaft 39 on which the positive feed mechanism 38 is secured.

The return movement of the lever 45 being effected by the spring 54, means are provided to check the vibrations of the spring, and for this purpose a stop rod 58 is secured to the top wall 3 of the camera, said stop rod carrying adjustably at its lower end by means of the screw 59 a rubber covered stop button 60 against which a lateral flange 61 of the lever 45 impinges when said lever has been drawn upward by the spring 54. The entire structure forms a quick acting mechanism in which the periods between each two successive advance movements of the film are separated by a relatively longer period in which the film is held stationary. The two movements of positively feeding the film and of winding it up are suitably timed relatively to each other, both of these movements being derived from a single source, namely, the driving shaft 25.

The lever 45 may also be utilized for actuating a suitable counter mechanism, as illustrated in Fig. 2. For this purpose a rod 62 is secured at one end to the lever 45 so as to extend in slanting direction towards the rear wall 2 of the camera. The outer end of this rod 62 is constructed as a pawl 63 in operative engagement with a ratchet 64 forming a part of the counter 65 of which the casing only is indicated, the detail construction of the counter itself being of minor importance for the present application. This counting mechanism is equipped in a well known way with a plurality of number wheels (not shown in the drawing) and the numerals on these wheels are displayed through the rear wall 2 of the casing by means of a window, of which a frame 66 only is indicated in Fig. 2. As each of the movements of the lever 45 indicates the feeding step of the film, it is obvious that by means of this counter the number of the feeding steps will be visibly indicated and as by each feeding step a group of pictures are taken or projected respectively, the counter also shows the number of the groups that have been made or projected.

The main shaft 25 extending transversely of the camera also is used for positively driving a shutter through which the fixed film opening is alternately obstructed and freed. A bevel gear 67, mounted as shown in Fig. 7 at the end of the shaft 25, meshes with a similar bevel gear 68 mounted on a shaft 69 which is supported longitudinally of the camera in bearings, one of which is illustrated at 70. The front end of the shaft 69 has secured thereto a circular disc 72 forming the shutter, the details of which are illustrated in Fig. 5.

The circular disc is provided in the present instance with two groups of apertures, these two groups being arranged symmetrically relatively to each other, and the openings in each group being in approximately spiral relation to each other. The arcuate apertures in each group therefore have different distances from the center of the disc. The embodiment illustrated shows two groups of apertures, each containing three apertures $a$, $b$, $c$, and $a'$, $b'$, and $c'$ respectively. The apertures are arcuate and concentrically arranged with respect to the disc and it will be noted that the opening $a$ is closer to the center than the opening $b$, which latter again is closer to the center than the opening $c$, and a similar arrangement also applies to the apertures $a'$, $b'$ and $c'$. It will, furthermore be seen that the apertures having a larger distance from the center of rotation of the disc, also have an arcuate length of such dimension as to expose the film portions for the same duration for which they are exposed through the apertures of smaller arcuate length, which, however, are closer to the center of rotation. The portions of the discs having the apertures $c$, $c'$ will rotate at a higher circumferential speed than the apertures $a$, $a'$, and if, therefore, the apertures $c$, $c'$ would not be longer circumferentially than the other apertures, the exposure of the film through apertures $c$, $c'$ would be too short compared with the exposure of the film through the apertures $a$ $a'$.

Owing to this arrangement of the shutter apertures, it is also obvious that as viewed in Fig. 5, the aperture $a$ will expose a film portion near the left margin of the film, the aperture $b$ a film portion near the longitudinal central part of the film, and the aperture $c$ will serve for exposing a film portion near the right hand margin of the film. The symmetrical arrangement of the groups of apertures in the shutter, furthermore, indicates that subsequent to the exposure of a left hand marginal portion of the film through the aperture $a$, the next portion to be exposed will again be near the left hand margin. It is, therefore, necessary that the film should be fed one step after an exposure of the left hand marginal film portion has taken place through the aperture $a$. In the same way it will be noticed that subsequent to the exposure of a portion of the film near the right hand margin by means of the aperture $c'$, the next exposure will take place through the aperture $c$ also near the right hand marginal portion of the film, whereby the sequence of the images produced on the film will be that sequence which is illustrated in Fig. 8. According to this figure, the images pertaining to one transverse row or group of images, beginning for instance with the left hand margin, is followed by another row on which the first image is taken near the right hand margin, that is, near that margin near which the first group terminated, and again subsequent to the production of pictures in the second group beginning at the left hand margin and ending at the right hand margin; the sequence of the images, therefore, may be stated to be a zigzag formation. The actual time of exposure for the various pictures in each group, however, is equalized by lengthening the apertures arranged on portions of the disc traveling with higher circumferential speed as compared to those apertures in the shutter disc which are arranged in the portions traveling at a lower speed.

What has been stated here with respect to the production of pictures naturally also applies in the projection of pictures.

It will also be seen that it is necessary to maintain the film stationary until an entire group of pictures transversely of the film has been completely taken or projected respectively, and to cause the advance step of the film to occur in coincidence with change from one group of exposure apertures to another group. The advance step of the film, therefore, will occur in coincidence with the travel of the shutter portion $x$ located between the openings $a$, $a'$ and it will furthermore occur during the period in which the shutter portion $y$ between the openings $c'$ and $c$ is advanced across the pertaining portion of the film. These arcuate portions $x$, $y$ of the shutter being relatively small compared with the corresponding other circular portions of the shutter, it is obvious that the film movement must be a very quick and sudden one, while the dwell of the film coinciding with the register of the apertures $a$, $b$ and $c$ and the intervening shutter portions $t'$ and $u'$ (or $a'$, $b'$, $c'$, $t$, $u$) across the film, will consume considerably more time.

The construction of the optical equipment may best be understood by reference to Fig. 4. The front wall 1 of the casing is provided with the fixed opening of rectangular area 73 into which a casing 74 may be inserted so as to be retained thereby frictionally, or in some other way.

This optical equipment includes a plate 75 at the front surface of the front wall. This plate is to be removed when the camera is to be changed from a taking camera to a projecting camera. Another plate of rubber indicated at 76 is placed tight against the front plate 75. Another rubber plate 79 heavier than rubber plate 76 is separated from the latter by a metal plate 77 and at the back of the second or heavier rubber cushion 79, a plate 80 is secured in which the three lenses 80' are mounted. This entire structure held together by rivets or the like not illustrated in the drawing, is inclosed in the casing 74 and each of these plates is provided with an opening of rectangular area, the length of the opening being approximately the total of the diameters of the three juxtaposed lenses while the height of the opening is approximately equal to the diameter of a single lens, or equal to the height of each group of pictures extending transversely of the film. The openings in the various plates are in register with each other, permitting thereby the rays of light to pass through the various plates and through the lenses onto the film and constituting in their entirety a fixed film opening. When it is desired to utilize the camera for projecting purposes the optical equipment just described may be removed and another optical equipment may be attached to the front surface of the camera, this substitute optical equipment not being illustrated in the drawing.

Figure 1:
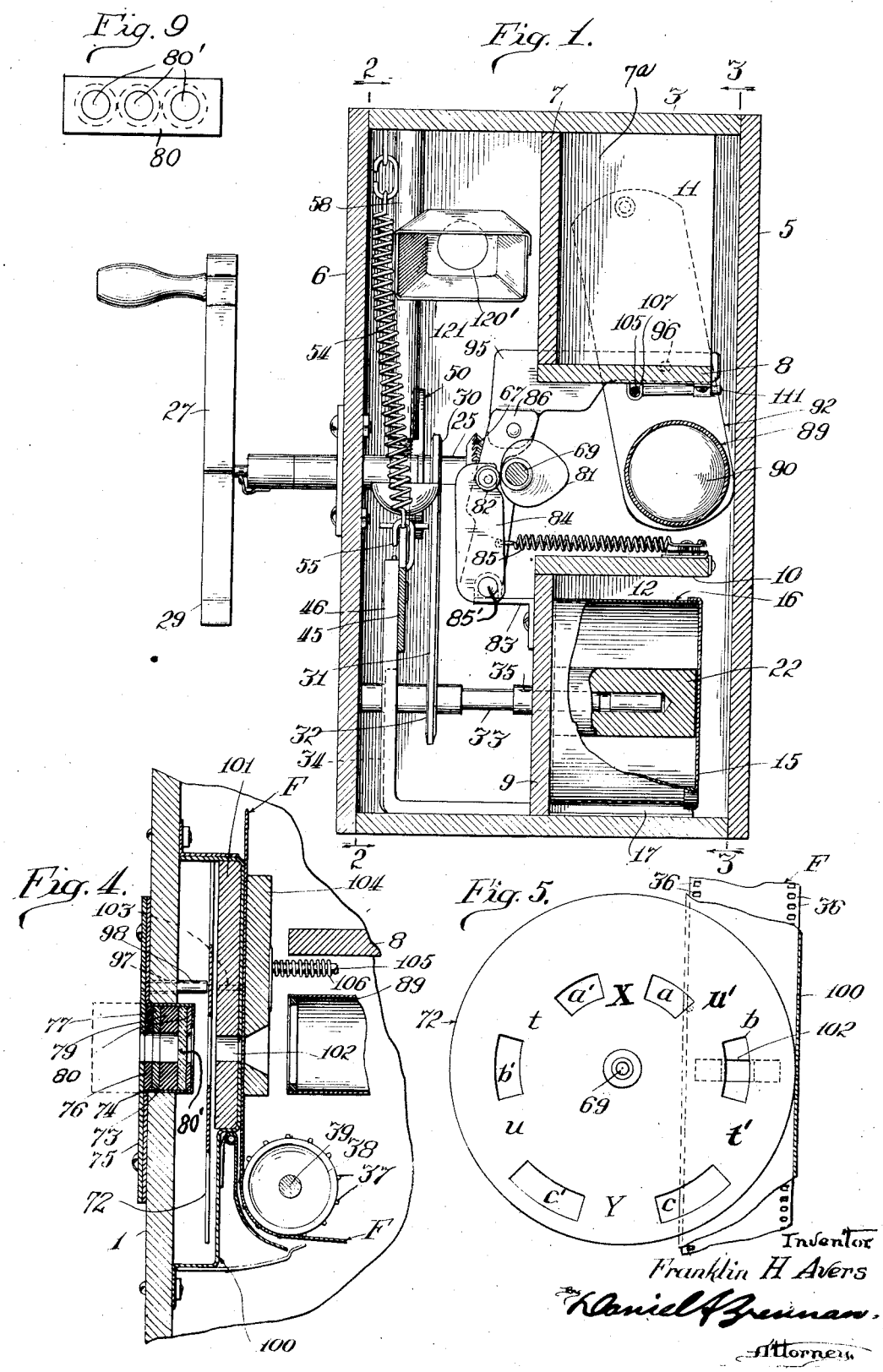
Fig. 1 is a vertical sectional view transversely of the camera.

In the use of the camera for projecting it is advisable to move the source of light to register approximately with those film portions which are to be intermittently exposed and this approximate transverse movement of the source of light is effected by the following mechanism: The shaft 69 for the shutter which extends longitudinally of the camera and which carries at its front end the circular shutter disc 72 is provided intermediate its ends with a cam 81, the configuration of which is shown in Fig. 1. The eccentric cam which is rotated in predetermined timed relation with the shutter and hence also in predetermined timed relation with the feed mechanism of the film, acts by means of its edge on a roller 82 projecting from a lever 84 which is pivoted at its lower end in a bracket 83. This lever 84 is maintained continuously in a position in which the edge of the cam 81 may act on the roller 82 by a spring 85 which has a tendency to move the lever to the right (Fig. 1). The pivot pin 85' to which the lever is fixed, extends parallel to the shaft 69 and carries at its other end fixedly a link 86 through which movement may be imparted to a projecting tube 89 containing a condenser lens 90 and to a lamp chamber 92 which is rigidly and angularly united with said lens tube, the arrangement of said chamber and said tube relatively to each other being such that the most effective part of the lamp 93, i. e., the center of the filament is approximately in axial alinement with the axis of the lenses 90.

From Fig. 3 it is apparent that the lamp chamber 92 containing the lamp 93 is pivotally suspended from a transverse shaft or rod 94 so as to be adapted to swing back and forth transversely of the opening in which the fixed film opening 102 is inserted.

In the operation of taking pictures it is not necessary to oscillate this source of light 93 and the collector lenses 90, and for this purpose the connection between the actuating mechanism of the camera and the mechanism for oscillating the assembly of the lamp and condenser lenses may be interrupted. The link 86 is therefore pivotally attached to an extension 95 which has at its other end a pin 96 insertable into the housing of the lamp chamber 92, the resiliency of the metal of the arm 95 being sufficient to permit readily the withdrawal of the pin 96 from the lamp housing, whereupon the arm 95 may be folded against lever 86, and in the operation of the camera the lamp chamber 92 and lens chamber 89 will not be moved back and forth transversely of the film.

From Figs. 4 and 5 it will also be seen that in addition to the opening in which the lenses may be inserted into the camera, the front wall has another opening 97 of very small diameter and in communication with a short tubing 98. The location of this opening 97 with respect to the path of the film is apparent from Fig. 8, from which it will be seen that upon passage of the apertures $a$, $a'$ of the shutter in front of the film the light will be permitted to enter through the opening 97 on the film, which latter after development will show a small mark 99 recurring at regular intervals on the margin of the film. These marks produced on the film will facilitate the subdivision of the film in accordance with the subject matters as to length, as in the finished film these marks will be juxtaposed to the left hand ends of each second transverse group of pictures on the film.

Fig. 8 illustrates how the apertures $a$, traveling across the opening 97, exposes thereby the portion of the film in opposition to the opening to produce in the finished film a conspicuous spot 99. Subsequent to the exposure of this spot the film is longitudinally fed one step and hence the passage of the next succeeding aperture *a'* over another portion of the film will again produce this mark 99, now located however opposite another transverse row of pictures.

In order to confine between each two feeding steps the exposed surface of the film to the total area to be occupied by the pictures pertaining to a single group, the front wall 1 of the camera supports a casing 100 in which is secured a board 101, having at 102 an opening of exactly the size of the combined area of the individual pictures pertaining to the same transverse group and also having a small circular opening 103 in alinement with the opening 97 of the front wall and with tube 98 for producing the recurring marking spot at the margin of the film. The lateral walls of the casing 100 are extended at 110 rearward beyond the rear face of the board 101, as may be seen from Fig. 3. The film is normally guided between these lateral extensions, and another board or film gate 104 which is loosely and rotatably secured to the front end of a rod 105 extending longitudinally of the camera. This rod carries a spring 106 which rests at one end against the back of the guide board 104 while its opposite end rests against a collar 107 which is fixed to the bottom of the upper compartment. The rod 105 is guided in clips also secured to the bottom of the compartment in which the upper film container 14 is rotatably mounted. The rear end of the rod is bent at 111 and the forward movement of the rod under the action of spring 106 is limited by means of a clip 108 on the bottom of this compartment. If it is desired to slightly withdraw the board 104 from the space between the lateral guides 110 of sheet metal, in order to facilitate the threading of the film into the machine and the movement of the film through the machine, the rod 105 may be slightly pulled backward, compressing the spring 106, and the bent portion 111 may be swung upward into the position indicated in Fig. 3 in dotted lines. In this position the spring 106 will then be compressed; but if the hook 111 is turned down, the spring 106 will force the board 104 tightly up against the film F so as to hold the film against further movement; and this naturally can only be effected after the lateral wall of the camera has been opened so as to grant access to the rod 105. In this way the film may be secured against movement in order to effect adjustment or repairs without any danger of pulling the film out of position.

In order to provide additional marks at arbitrarily selected points longitudinally of the film and near a margin of the same a pricking rod 112 is slidably guided in clips 113 which are mounted on the top of the lower compartment in the camera. A spring 114 resting at one end against this fixed clip, but surrounding the rod 112 and acting against a collar 115 of the rod normally has a tendency to hold the pointed end of the rod at a distance from the film. That end of the rod 112 which projects rearward from the camera carries a button 116, whereby upon pressure on this button overcoming the action of the spring 114, the pointed end of the rod 112 may be driven through the film so as to produce a prick mark thereon. This mark may indicate for instance, without calling for intense illumination or development of portions of the film, that at this particular point a series of pictures pertaining to one subject matter terminates so that a cutting of the film may be effected in this way.

The apparatus furthermore is equipped with a socket 117 into which a plug 118 of suitable construction may be inserted, so as to supply current from a suitable source (not shown) through the plug and socket to the wires 119 which lead to the lamp socket in the chamber 92, said lamp socket not being shown. The wires 119 preferably are flexible cords so as not to interfere with the oscillation of the lamp chamber 92 and condenser lens casing 89.

The ordinary finder known as usually employed with motion picture cameras may be provided. A lens of suitable structure (not shown) is seated in a frame indicated at 120 at the front end of the camera, and a chamber or passage 121 extends to a suitable opening 120' in the opposite or rear end of the same, permitting thereby in taking the picture to view the scene from the rear end of the camera. This scene appears on a very small area, larger however than the area on which it will be concentrated on the film itself.

The operation of the device will be clear from the above. In taking pictures an unexposed film inclosed in the container of the upper compartment is threaded through the interspace between the boards 101 and 104 while suitably guided over pins, and being then brought into engagement with the circumference of the feeding sprockets. The end of the film is introduced into the lower container and attached to the spool 22. The cap is then again placed on the lower container and the camera closed. When the crank 27 now is turned with that regularity which is required in motion picture operation, the film will be positively but intermittently fed by being withdrawn from the upper container and wound up on the lower container. At the same time and in timed relation with respect to the feeding movements of the film the shutter is operated so as to produce in each revolution in the embodiment disclosed, two successive rows of images successively, each row containing in accordance with the number of apertures on the shutter, three pictures.

When the film from the upper container has been exhausted the camera may be opened again and another standard film inclosed in a container may be inserted.

During this operation of taking pictures the connection between the actuating mechanism and the mechanism for operating the tube for the condenser lenses and for the source of light may be interrupted.

When it is desired, however, to project pictures this connection is established and the feeding of the film from an upper spool in the compartment 11 to the spool in the lower compartment may be carried on as described above. At the same time the source of light and the condenser lenses are actuated so as to illuminate intermittently the film and so as to concentrate the illumination on that film area which happens to be exposed through the aperture of the rotary shutter.

I claim:

1. In a camera having a film opening, a plurality of fixed lenses in alignment with said opening a mechanism for intermittently advancing a film past said opening, a source of light oscillatably suspended within the camera, and means operable in timed relation with respect to said film advancing mechanism for intermittently swinging said source of light transversely of the film.

2. In a camera having an exposure opening, a plurality of fixed lenses in alignment with and spaced transversely in said opening, a mechanism for intermittently advancing a film past said opening, a source of light, a rotary shutter shaft, a cam mounted on said shaft, and means operable by said cam for intermittently moving said source of light in predetermined timed relation with respect to the film feeding mechanism relatively of the film.

3. In a camera having an exposure opening, a plurality of fixed lenses in alignment with and spaced transversely in said opening, a mechanism for intermittently advancing a film past said opening, a rotary shutter shaft, a shutter mounted thereon, a cam on said shutter shaft, a source of light, a condenser lens in rigid association with said source of light, and means controlled by said cam for intermittently moving said source of light and condenser lens transversely of the film.

4. In a device of the character described having a fixed exposure opening, a plurality of fixed transversely spaced lenses secured to said device in front of said opening, means for feeding a film past said opening and preventing the film from transversely moving with respect to the opening, and means for projecting respectively pictures arranged in transverse rows on said film, said means comprising a transversely and intermittently movable source of light relative to the opening and film, and a shutter operating synchronously with said light source to permit the passage of light rays successively through said lenses and film.

5. In a device having a fixed exposure opening, a plurality of stationary objectives arranged transversely of the optical axis and of the film in front of said opening, means for feeding a film longitudinally in a relatively fixed straight line past said opening, means for preventing a transverse movement of said film relative to said opening, means for successively projecting respectively pictures arranged in transverse rows on said film through said objectives, said means comprising a rotary shutter provided with portions to obstruct different portions of said opening, a source of light intermittently moved transversely of said optical axis relative to the film, and means common to said shutter and said source of light for moving them in synchronism to effect registration of the light with the unobstructed portion of said opening.

6. In a device of the character described having a fixed exposure opening, means for intermittently feeding a film longitudinally past said opening, said film having transverse rows of different images, a stationary set of transversely spaced objectives in alignment with said fixed exposure opening corresponding in number to the images constituting the transverse rows, a shutter interposed between the objectives and the film, said shutter being provided with portions adapted to successively obstruct different portions of said opening, a light source, said light source and said shutter being movable synchronously by common operating mechanism across the optical axes of said objectives, and means for preventing transverse movement of the film.

7. In a device of the character described having a fixed exposure opening and a set of fixed transversely spaced objectives in alignment therewith, means for intermittently moving a film longitudinally past said opening, said film having transverse rows containing a plurality of different images, a rotary shutter interposed between the film and said opening, and means for continuously rotating said shutter past said opening, said shutter being provided with apertures at different distances from the axis of rotation, said apertures being adapted to register with different portions of said opening for uniform periods to thereby expose individual images with respect to the corresponding objective, while obstructing the other different images of the transverse rows with respect to said opening, a transversely moving source of light, means for preventing transverse movement of the film, and means for co-ordinating the longitudinal movement of the film and the movement of said shutter and light source in such a way that the film will be prevented from longitudinal movement while the images constituting the transverse rows are being projected seriatim by said light source through said objectives.

8. In a device of the character described having an exposure opening, a plurality of fixed transversely spaced lenses mounted in said exposure opening, a mechanism for intermittently advancing a film past said opening, a source of light, a condenser lens, and means operatively associated with said first named mechanism for intermittently moving said condenser lens and light source transversely of the film into registration successively with said fixed lenses.

9. In a device of the character described having an exposure opening, a plurality of transversely spaced fixed lenses mounted in said exposure opening, means for intermittently advancing a film past said opening, a source of light, a condenser lens fixedly connected with said source of light, a mechanism operable in predetermined timed relation with respect to said film feeding mechanism for moving said condenser lens and source of light simultaneously relatively to said film into successive registration with said lenses, and a shutter operated by said light moving mechanism in synchronism with the movement of said source of light.

10. In a motion picture projector having a plurality of fixed transversely spaced optical axes, a film gate having an aperture therein in alignment with said optical axes, a film strip having a series of groups of pictures thereon arranged transversely of the film movable step by step in front of said axes and successively in groups into registration with said axes, means for projecting light rays along said optical axes successively through said aperture, and a shutter operating synchronously with the projection of light rays so as to expose seriatim portions of said film through said plurality of optical axes.

11. In a motion picture projector having a plurality of fixed transversely spaced optical axes, a film gate having an aperture therein on said optical axes, a film strip having a series of transverse groups of pictures thereon movable step by step in front of said axes and successively in groups into registration with said aperture, a light source movable transversely of said optical axis and having the rays therefrom projected through said aperture, and a shutter operable by said light source actuating means operating synchronously with said light source having means for seriatim exposing and permitting projection of light rays from said source through said aperture.

12. In a projector, a stationary film gate past which a film containing a plurality of pictures arranged in series of transverse groups is adapted to be intermittently moved, said gate having a projection opening in axial alignment with the pictures of each group, and fixed with respect to the optical axis of the projector, a housing having a source of light therein movable across the optical axis of said opening and having a condenser lens mounted therein, a rotating shutter operable by the light source operating means arranged between said lens and said projection opening and having staggered openings adapted to align with the projection opening through which the light rays are successively projected and synchronously with the movement of said light source so that the rays of light are caused to be projected through each of the pictures on said film at substantially a right angle to the plane of the film.

13. In a projector, a stationary film gate past which a film containing a plurality of pictures arranged in series of transverse groups is adapted to be intermittently moved, said gate having a projection opening in axial alignment with the pictures of each group, and fixed with respect to the optical axis of the projector, a housing having a source of light therein movable across the optical axis of said opening and having a condenser lens mounted therein, means for intermittently swinging said source of light and condenser lens in an arc intersecting said optical axis, a rotating shutter between said lens and said projection opening operable by said means and having staggered openings adapted to align with the projection opening through which the light rays are successively projected and synchronously with the movement of said light source so that the rays of light are caused to be projected through each of the pictures on said film at substantially a right angle to the plane of the film.

14. In a projector, a stationary film gate past which a film containing a plurality of pictures arranged in series of transverse groups is adapted to be intermittently moved, said gate having a projection opening in axial alignment with the pictures of each group, and fixed with respect to the optical axis of the projector, a housing having a source of light therein movable across the optical axis of said opening and having a condenser lens mounted therein, means including a support for intermittently swinging said source of light and condenser lens in an arc intersecting said optical axis, said means also including a cam actuating a toggle connected to said support, a rotating shutter between said lens and said projection opening operable by the means for moving said source of light, and having staggered openings adapted to align with the projection opening through which the light rays are successively projected and synchronously with the movement of said light source so that the rays of light are caused to be projected through each of the pictures on said film at substantially a right angle to the plane of the film.

In testimony whereof I affix my signature at Portage, Wisconsin.

FRANKLIN H. AVERS.